(12) United States Patent
Tanaka

(10) Patent No.: US 7,489,608 B2
(45) Date of Patent: Feb. 10, 2009

(54) WOBBLE SIGNAL DETECTION

(75) Inventor: Akio Tanaka, Alta, CA (US)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 660 days.

(21) Appl. No.: 11/250,515

(22) Filed: Oct. 17, 2005

(65) Prior Publication Data

US 2007/0086298 A1    Apr. 19, 2007

(51) Int. Cl.
*G11B 7/00* (2006.01)
(52) U.S. Cl. ............................. 369/53.34; 369/124.05; 369/44.13
(58) Field of Classification Search ........................ None
See application file for complete search history.

(56) References Cited

U.S. PATENT DOCUMENTS

| | | | | |
|---|---|---|---|---|
| 7,095,681 B2 * | 8/2006 | Park et al. | ................. | 369/44.13 |
| 7,123,557 B2 * | 10/2006 | Heemskerk et al. | ...... | 369/47.19 |
| 7,149,170 B2 * | 12/2006 | Dai | ........................ | 369/59.19 |
| 7,212,486 B2 * | 5/2007 | Mashimo et al. | ........ | 369/124.12 |
| 2003/0099172 A1 * | 5/2003 | Park et al. | ................. | 369/47.22 |
| 2004/0071228 A1 * | 4/2004 | Nakata et al. | ................ | 375/336 |
| 2004/0145981 A1 | 7/2004 | Mashimo | .................. | 369/47.17 |
| 2004/0174800 A1 | 9/2004 | Heemskerk et al. | .......... | 369/125 |
| 2005/0226108 A1 * | 10/2005 | Ichimura | .................. | 369/44.28 |
| 2006/0126454 A1 * | 6/2006 | Serrano et al. | ............ | 369/44.13 |

OTHER PUBLICATIONS

White paper Blu-ray Disc Format 1.A Physical Format Specifications for BD-RE, Aug. 2004 1-33.

* cited by examiner

*Primary Examiner*—Peter Vincent Agustin
(74) *Attorney, Agent, or Firm*—Lee & Morse, P.C.

(57) ABSTRACT

Wobble detection for detecting data in a wobble signal modulated with a base signal includes sampling the wobble signal at a substantial maximum and a substantial minimum of a base signal within a wobble period, producing a value of the wobble signal at the substantial maximum of the base signal with an unchanged sign and a value of the wobble signal at the substantial minimum of the base signal with a reversed sign, determining a sum of the values within the wobble period, and decoding the sum to detect data.

24 Claims, 6 Drawing Sheets

WOBBLE SIGNAL DETECTION

BACKGROUND OF THE INVENTION

1. Field of the Invention

The present invention relates to a wobble information detection method and system, for operation on a wobble signal output from an optical disc. In particular, the present invention relates to a wobble information detection method and system for detecting address information that has been encoded with minimum shift keying (MSK) and harmonic modulated wave (HMW) modulations, used for Blu-ray disc (BD), and/or with bi-phase (BP) modulation used in DVD formats, e.g., high definition digital versatile disc (HD-DVD) and digital versatile disc recordable and rewritable (DVD+R/RW) formats.

2. Description of Related Art

A conventional multi-format-compatible optical disc system includes an optical disc, an optical disc motor that rotates the optical disc, servo drivers that control the speed of the disc motor, and an optical pickup unit (OPU) that senses wobble information stored on the optical disc and generates a signal in response thereto. Since modulation of wobble signals for BDs is different from that for DVDs, the OPU can be used to sense differently encoded wobble signals on an optical disc.

Wobble signals sensed by the OPU are analyzed as a low pass filtered wobble signal, which contains address in pregroove (ADIP) information and a recovered wobble carrier signal, also known as monotone wobble. The DVD format employs BP modulation, and, thus, is conventionally decoded using an exclusive OR (EXOR). The BD format, however, employs two different types of wobble modulation, combining MSK modulation, which uses a ×1.5 multiple of the frequency of the carrier signal, and HMW modulation, which uses a second harmonic of the carrier signal. These modulation schemes are not as simple to decode as the phase modulation schemes of DVD formats.

MSK modulation is realized by replacing every three monotone wobbles with one MSK Mark (MM). An MM includes three nominal wobble length (NWL) wobbles having the following wobble pattern: $\cos(1.5\omega t)$, $-\cos(\omega t)$ and $-\cos(1.5\omega t)$. Thus, the MSK modulation uses one type of waveform, and differences in waveform position supply the information.

The HMW modulation is defined as $\cos(\omega t) \pm \sin(2\omega t)$, resulting in two characteristic sawtooth waveforms (STWs). The STW including $-\sin(2\omega t)$ has edges that fall gently at the beginning of the cycle and rise steeply at the end of the cycle, while the STW including $+\sin(2\omega t)$ has edges that fall steeply at the beginning of the cycle and rise gently at the end of the cycle.

Each BD ADIP unit includes fifty-six (56) wobbles. Each BP ADIP unit begins with a starting MM signal that serves as sync for the BP ADIP unit. The difference in position of a second and a third MM signal following the starting MM signal represents the type of ADIP unit. The ADIP address and sync is decoded by analyzing the detected MM data. Even though MSK modulation is more sensitive to phase shift noise, it provides accurate position information useful for sync, whereas HMW modulation provide more accurate data "0" and data "1" detection since the data "1" STW and data "0" STW signals are repeated 37 times.

Since there are 69 channel clock signals in one BD wobble cycle and HMW uses the second harmonic of the wobble clock, a second clock recovery circuit is needed to generate the second harmonic of the wobble. Thus, in order to perform analog synchronous detection of MM and STW, two sets of multipliers, integrators and clock recovery circuits are required. Such analog components consume large chip area and power.

SUMMARY OF THE INVENTION

The present invention is therefore directed to a method and system for wobble detection, which substantially overcome one or more of the problems due to the limitations and disadvantages of the related art.

It is therefore a feature of an embodiment of the present invention to provide a common set of digital logic which can be used to decode MSK and STW modulation used in a Blu-ray disc without the use of analog multipliers and integrators.

It is another feature of an embodiment of the present invention to provide decoding of complex modulation signals using only digital components.

It is yet another feature of an embodiment of the present invention to sample the wobble signal at substantially the minimum and maximum of a base signal.

It is still another feature of an embodiment of the present invention to provide a common set of digital logic which can be used to decode BD formats and DVD formats.

It is yet another feature of an embodiment of the present invention to use common logic elements to reduce the number of components in a decoding system.

At least one of the above and other features and advantages of the present invention may be realized by providing a wobble detection method for detecting data in a wobble signal, including sampling the wobble signal at a substantial maximum and a substantial minimum of a base signal within a wobble period, producing a value of the wobble signal at the substantial maximum of the base signal with an unchanged sign and producing a value of the wobble signal at the substantial minimum of the base signal with a reversed sign, generating a sum of the values within the wobble period, and decoding the sum to detect data.

The method may further include comparing the sum to a threshold and determining a result to be used in decoding. The comparing may compare the sum to a positive threshold and a negative threshold. The positive and negative thresholds may be for an MM signal or a STW signal. When the sum exceeds the positive threshold, a first type of data may be detected, when the sum exceeds a negative threshold, a second type of data may be detected, and when the sum is between the positive and negative thresholds, a third type of data may be detected. Patterns of detected data values are further processed to decode the ADIP synchronization signal and/or decode the data.

The base signal may be at a carrier frequency $\omega$ of the wobble signal, e.g., may be $\sin(\omega t)$ or $\cos(\omega t)$. Sampling may include sampling the wobble signal at substantially 0.25 and 0.75 of the wobble period for $\sin(\omega t)$ or 0.5 and 1.0 for $\cos(\omega t)$. For example, when the wobble period has 69 channel clock signals, sampling may be discrete at a $17^{th}$ and $51^{st}$ clock signal for $\sin(\omega t)$.

The base signal may be at a harmonic, e.g., the second harmonic, of a carrier frequency $\omega$ of the wobble signal. Sampling may include sampling the wobble signal at substantially 0.125, 0.375, 0.625 and 0.875 of the wobble period. For example, when the wobble period has 69 channel clock signals, sampling may be discrete at a $9^{th}$, a $26^{th}$, a $43^{rd}$ and a $60^{th}$ clock signal.

A plurality of wobble cycles may be summed before decoding. Sampling may include sampling at a plurality, e.g., two, of maxima and minima within the wobble period.

At least one of the above and other features and advantages of the present invention may also be realized by providing a detector for use with an optical pickup unit outputting a wobble signal, the detector including a sampler to discretely sample the wobble signal at a substantial maximum and a substantial minimum of a base signal within a wobble period, an alternate sign operator to change a sign at alternate samples and to output resultant values, an accumulator to sum the values output by the alternate sign operator within the wobble period, and a decoder to decode a sum output by the accumulator.

The detector may include a comparator to compare the sum output by the accumulator with a threshold and to output a result to the decoder. The comparator may compare the sum to a positive threshold and a negative threshold. The positive and negative thresholds may be for a MSK signal or a STW signal. The comparator may output a first data type when the sum exceeds the positive threshold, a second data type when the sum exceeds a negative threshold, and a third data type when the sum is between the positive and negative thresholds. A pattern of values may establish the ADIP synchronization signal and/or ADIP data.

The sampler may sample the wobble signal at substantially 0.25 and 0.75 of the wobble period, or at substantially 0.5 and 1.0 of the wobble period. When the wobble period has 69 channel clock signals, the sampler may sample the wobble signal at a $17^{th}$ and $51^{st}$ clock signal. The sampler may sample the wobble signal at substantially 0.125, 0.375, 0.625 and 0.875 of the wobble period. When the wobble period has 69 clock signals, the sampler may sample the wobble signal at a $9^{th}$, a $26^{th}$, a $43^{rd}$ and a $60^{th}$ clock signal.

At least one of the above and other features and advantages of the present invention may further be realized by providing an article of manufacture having a machine-accessible medium including data that, when accessed by a machine, cause the machine to detect data in the wobble signal according to any of the above detection methods.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
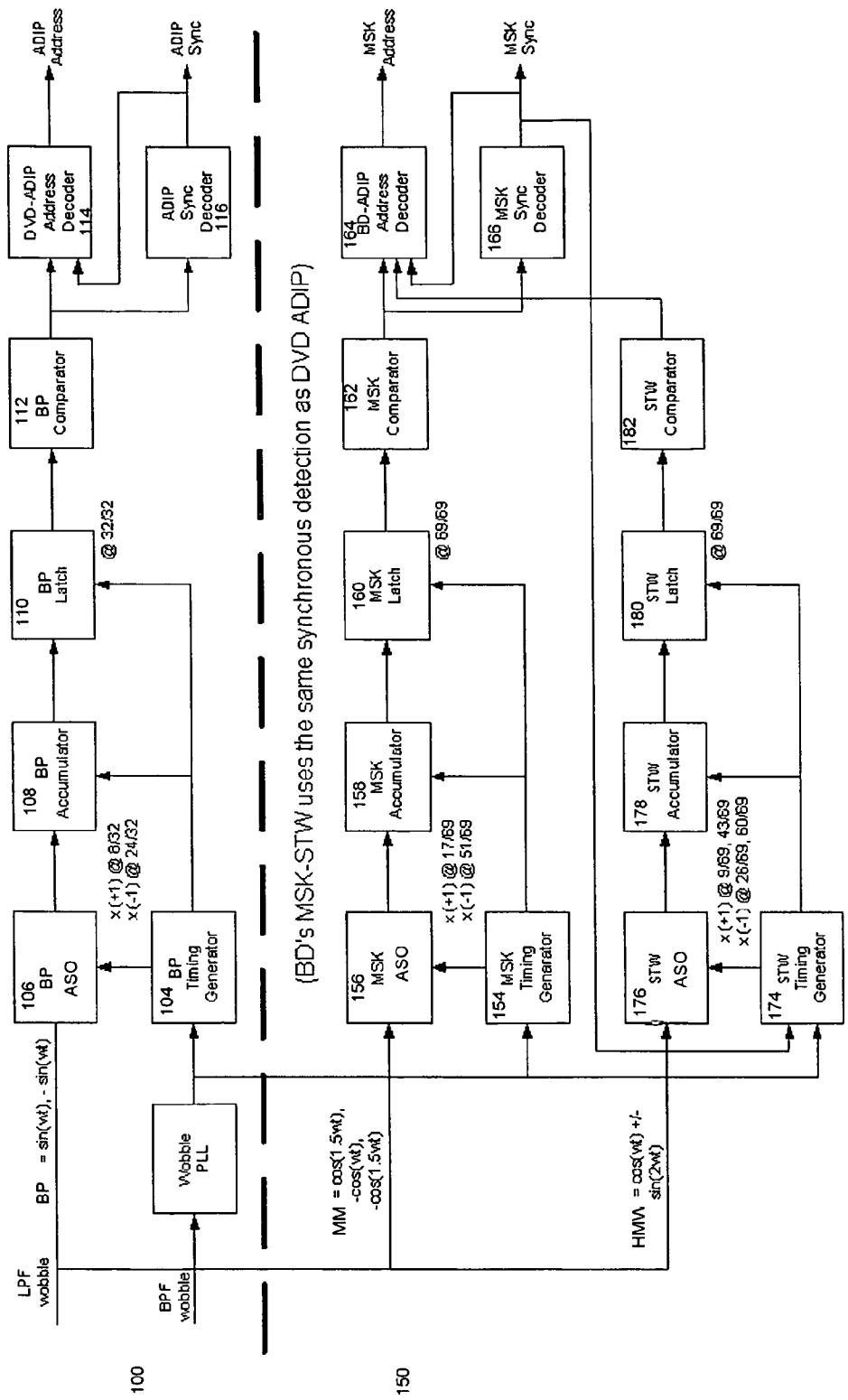
FIG. 1 illustrates a block diagram of a detection system according to an embodiment of the present invention.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. For ease of explanation, as used herein, "base signal" is to refer to $\cos(\omega t)$ for BD MSK, $\sin(2\omega t)$ for BD HMW, and $\sin(\omega t)$ for DVD BP.

In accordance with an embodiment of the present invention, realizing that since the wobble signal is phase locked, positions of maxima and minima of the base signal used to modulate the wobble signal can be readily determined. For example, the maximum and minimum $\sin(\omega t)$ will be at 0.25 and 0.75 of the wobble period, the maxima and minima of the $\sin(2\omega t)$ will be at the 0.125, 0.375, 0.625 and 0.875 of the wobble period and the maximum and minimum of $\cos(\omega t)$ will be at 0.50 and 1.0 of the wobble period. For DVD+R/RW modulation, which has thirty-two (32) channel clocks in the wobble period, this is readily achieved using integer clock signals. For BD modulation, there are sixty-nine (69) channel clocks in the wobble period and for HD-DVD, there are ninety-three (93) channel clocks in the wobble period. Thus, exact sampling of these multiples would require sampling at non-integer clock signals. However, sufficient resolution for both the fundamental and second harmonic may be provided at integer clocks substantially close to these multiples of their respective base signals. Thus, in accordance with an embodiment of the present invention, rather than requiring integration through the whole wobble period, the wobble signal may be sampled at discrete points. Further, since the sampling is to occur close to the maxima and minima of the carrier signal or its second harmonic, only an alternate sign operation, i.e., inverting the sign between samples at the discrete points, is required, rather than multiplication. In other words, a value of the wobble signal at a maximum of the base signal will be output with an unchanged sign, while a value of the wobble signal at a minimum of the base signal will be output with a reversed sign.

Figure 2:
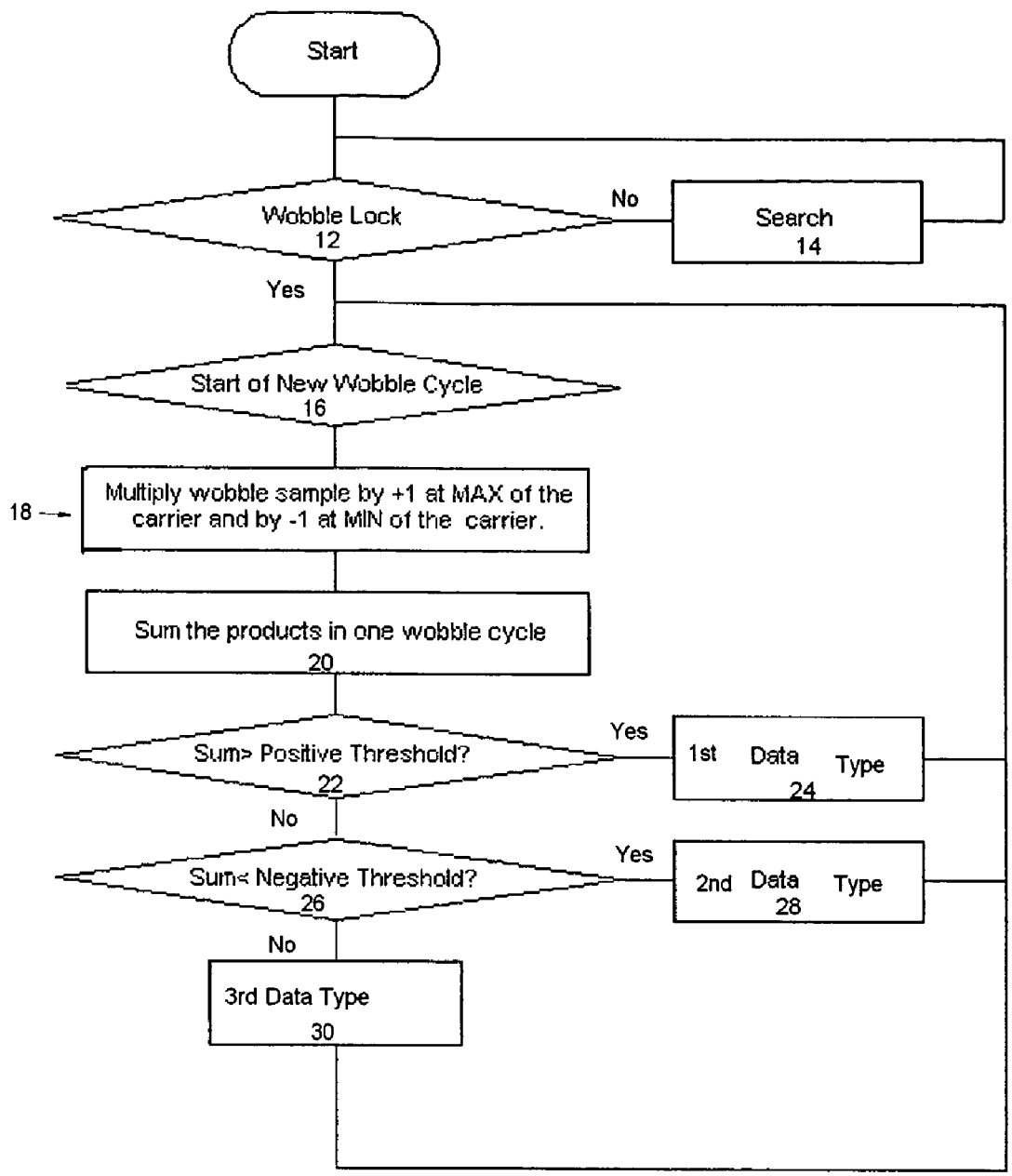
FIG. 2 illustrates a flowchart of a wobble demodulator according to an embodiment of the present invention.

A block diagram of a detection system in accordance with an embodiment of the present invention is illustrated in FIG. 1. This detection system may be used with a conventional optical disc system discussed above. An overview of the operation of the detection system will be discussed first with reference to FIG. 2, which illustrates a flowchart for detecting a wobble signal in accordance with an embodiment of the present invention.

In step 12, it is determined whether a wobble signal is locked. If it is not locked, searching continues in step 14. Once locked, a new wobble cycle is started in step 16. In step 18, a wobble signal is output at the MAX of the base signal and an inverse wobble signal is output at the MIN of the base signal during one wobble cycle. Conceptually, this is the same as multiplying the MAX by +1 and the MIN by −1. The outputs in one wobble cycle are added in step 20, and the resultant sum is compared with positive and negative threshold values. If the sum is determined in step 22 to be above the positive threshold, it is decoded as a first data type in step 24. If the sum is determined in step 26 to be below the negative threshold, it is decoded as a second data type in step 28. If the sum fails both step 22 and step 26, i.e., the sum is between the two thresholds, then the sum is decoded as a third data type in step 30. The actual data each data type corresponds to depends on the modulation used. Of course, the order of the comparisons is not critical.

For demodulating the MM, differentiation between the Monotone Wobble (MW) and the three cycles of the MM may be used. In the particular embodiment shown in FIG. 2, the first data type is MW, the second data type is Inverted Wobble (IW) and the third data type is Undefined (U). A normal pattern of MM will look like:

MW MW U IW U MW MW

Due to noise, U may be detected as MW or IW. However, by tracking the detected patterns, this misdetection can be corrected.

For demodulating the HMW, differentiation between the MW and the two types of STW may be used. In the particular embodiment shown in FIG. 2, the first data type is "1", the second data type is "0" and the third data type is MW. Due to noise, the first and second data types may be detected as MW. Since the particular STW is repeated 37 times by summing over the 37 STW or by looking at the pattern over the 37 STW wobble cycles, the decoder can reliably detect the first and second data types.

For demodulating the DVD BP, differentiation between the Normal Phase Wobble (NPW) and the Inverted Phase Wobble (IPW) may be used. In the particular embodiment shown in FIG. 2, the first data type is NPW, the second data type is IPW and the third data type is undefined (U). While a threshold is not strictly needed for this DVD BP detection, using a threshold and allowing for undefined values may provide more robust detection.

FIG. 1 illustrates a block diagram of a system which receives the output of the OPU and includes a DVD decoder 100 and a BD decoder 150 in accordance with an embodiment of the present invention. The DVD decoder 100 includes a wobble phase locked loop (PLL) 102, a BP timing generator 104, a BP alternate sign operator (ASO) 106, a BP accumulator 108, a BP latch 110, a BP comparator 112, a DVD-ADIP address decoder 114 and an ADIP sync decoder 116. The BD decoder 150 includes a MSK timing generator 154, a MSK alternate sign operator (ASO) 156, a MSK accumulator 158, a MSK latch 160, a MSK comparator 162, a BD-ADIP address decoder 164, a MSK sync decoder 166, a STW timing generator 174, a STW alternate sign operator (ASO) 176, a STW accumulator 178, a STW latch 180, and a STW comparator 182.

In operation, the OPU provides a low-pass filtered (LPF) wobble signal to the BP ASO 106, the MSK ASO 156, and the STW ASO 176. The OPU also provides a bandpass filtered (BPF) wobble signal to the wobble PLL 102. The wobble PLL 102 detects edge components from the input BPF wobble signal and outputs a PLL wobble clock, which is synchronized with the lowpass filtered (LPF) wobble signal, to the BP timing generator 104, the MSK timing generator 154 and the STW timing generator 174. The BP timing generator 104 divides the wobble clock into 32 clocks for DVD+R/RW and 93 channel clocks for HD-DVD, while the MSK timing generator 154 and the STW timing generator 174 divide the wobble clock into 69 channel clocks.

While the DVD format can be decoded in a conventional manner, the DVD decoder 100 shown in FIG. 1 is illustrated to parallel the decoding logic used in for the BD format, described in detail below.

The BP timing generator 104 outputs a first timing signal to the BP ASO 106, the BP accumulator 108 and the BP latch 110. The BP ASO 106, controlled by the first timing signal, samples the wobble signal at the maximum and minimum of the base signal for the BP, as discussed above. The BP ASO 106 outputs a value of the sampled wobble signal at the maximum of the base signal with an unchanged sign or outputs a value of the sampled wobble signal at the minimum of the base signal with a reversed sign, to the BP accumulator 108. The BP accumulator 108 adds signals output by the BP ASO 106 over the wobble period, which is output from the BP timing generator 154. The BP latch 110 latches the sum from the ADIP accumulator 108 in accordance with the first timing signal.

The BP comparator 112 compares a latched value, latched by the BP latch 110, with a threshold value and outputs BP data to the DVD-ADIP address decoder 114 and the ADIP sync decoder 116. When the threshold value is zero, the ADIP comparator 112 may be omitted, and the sum output directly to the ADIP decoders. The ADIP sync decoder 116 outputs the ADIP sync signal, which is input to the DVD-ADIP address decoder 114.

The MSK timing generator 154 outputs a second timing signal to the MSK ASO 156, the MSK accumulator 158 and the MSK latch 160. The MSK ASO 156, controlled by the second timing signal, samples the wobble signal at the maximum and minimum of the base signal for MSK, as discussed above. The MSK ASO 156 outputs a value of the sampled wobble signal at the maximum of the base signal with an unchanged sign or outputs a value of the sampled wobble signal at the minimum of the base signal with a reversed sign, to the MSK accumulator 156. The MSK accumulator 158 adds the signals output by the MSK ASO 156 over a cycle of the wobble signal in accordance with the second timing signal. The MSK latch 160 latches the sum from the MSK accumulator, in accordance with the second timing signal.

The MSK comparator 162 compares a latched value output from the MSK latch 160 with positive and negative threshold values. If the latched value is above the positive threshold, it is decoded as Monotone Wobble (MW). If the latched value is below the negative threshold, it is decoded as Inverted Wobble (IW) of the MSK Mark. If the latched value is between the two thresholds, it is decoded as UNDEFINED (U) or cos(1.5 wt) of the MM. The latched value will, therefore, yield a sequence of MWs, Us, and IWs. By analyzing the pattern of the values output by the MSK comparator 162, MSK sync decoder 166 detects the ADIP unit sync and ADIP sync, and the BD-ADIP address decoder 164 decodes the ADIP data as discussed in detail below.

The latched value will, therefore, yield a sequence of MW, IW and U, as noted above with reference to FIG. 2. By analyzing the pattern of the values output by the MSK comparator 162, the BD-ADIP address decoder 164 decodes the modulation data pattern. There is also a clear transition from monotone to MSK modulated area, which the MSK sync decoder 166 detects as a sync pattern, as discussed in detail below.

The STW timing generator 174 outputs a third timing signal to the STW ASO 176, the STW accumulator 178 and the STW latch 180. The STW ASO 176, controlled by the third timing signal, samples the wobble signal at the maxima and minima of the base signal for STW, as discussed above. The STW ASO 176 outputs a value of the sampled wobble signal at the maximum of the base signal with an unchanged sign or outputs a value of the sampled wobble signal at the minimum of the base signal with a reversed sign, to the STW accumulator 178. The STW accumulator 178 adds the signals output by the STW ASO 176 over the duration of the third timing signal. The STW latch 180 latches the sum from the MSK accumulator, in accordance with the third timing signal.

The STW comparator 182 compares the latched value, output from the STW latch 180, with a threshold value and outputs a value to the BD-ADIP address decoder 164. As noted above with reference to FIG. 2, if the latched value is larger than the positive threshold, the STW is decoded as data "1". If the latched value is smaller than the negative threshold, the STW is decoded as data "0". If the latched value is in between the positive and negative threshold, the STW is decoded as Monotone Wobble (MW). Thus, a sequence of data "1", data "0", and MW is output by the STW comparator 182. By analyzing the pattern of the values output by the STW comparator 182, the BD-ADIP address decoder 164 decodes the ADIP data.

Figure 3:
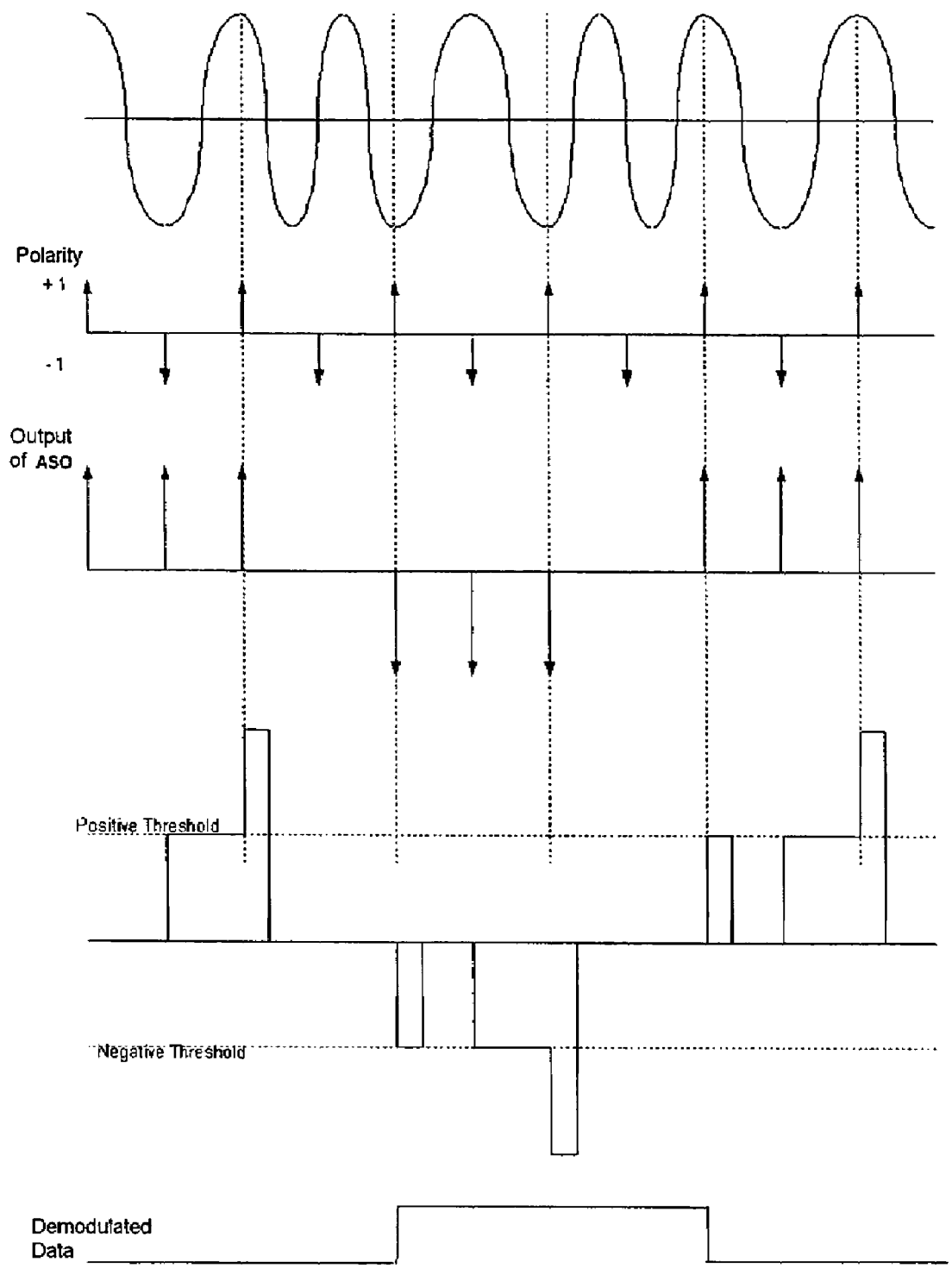
FIG. 3 illustrates a waveform of BD MM detection and the corresponding outputs of an alternate sign operator and accumulator according to an embodiment of the present invention.

FIG. 3 illustrates a waveform of BD MSK detection, corresponding polarities for the maximum and minimum, outputs of the ASO, the sum, and the demodulated data. The MM signal consists of three wobble cycles, i.e., cos(1.5 ωt), −cos(ωt) and −cos(1.5ωt). During the monotone, the sum will be a large positive number, which will be decoded as MW. Once locked to decode the MSK signal, the LPF wobble signal is sampled at discrete clocks, e.g., 34/69, 69/69, and then multiplied by +1 at the MAX peak of the base signal, which for MM is the carrier signal, and by −1 at the MIN of the base signal during one wobble cycle. At the end of the cycle, the two products are added. The sum during the first MM cycle will be between about zero to a slightly negative number. The sum during the second MM cycle will be a large negative number, which will be decoded as IW. The sum during the third MM cycle will be between about zero to a slightly positive number.

The sum is compared with positive and negative threshold values. The sum above the positive threshold is decoded as MW and the sum below the negative threshold is decoded as IW. The sum between the two threshold values is decoded as UNDEFINED (U). The pattern of the summed value is processed by digital logic to detect the MM signal. Assuming there is no noise, the monotone will always be decoded as a MW and the inverted monotone will always decode as IW. The leading MM signal will give a sum between zero and small negative value, which will decode as UNDEFINED (U). The trailing MM signal will give a sum between zero and a small positive value, which will decode as UNDEFINED (U). So the following pattern may occur during MSK sync.

MW-MW-(U)-(IW)-(U)-MW-MW.

Thus, the start of the MM, indicated above by the parentheses, can be detected by looking for the MW-U transition. Noise can cause the UNDEFINED to be detected as MW or IW, but since the processing is now done in the digital domain, more sophisticated conventional signal processing for sync search-protect logic may be employed.

Figure 4:
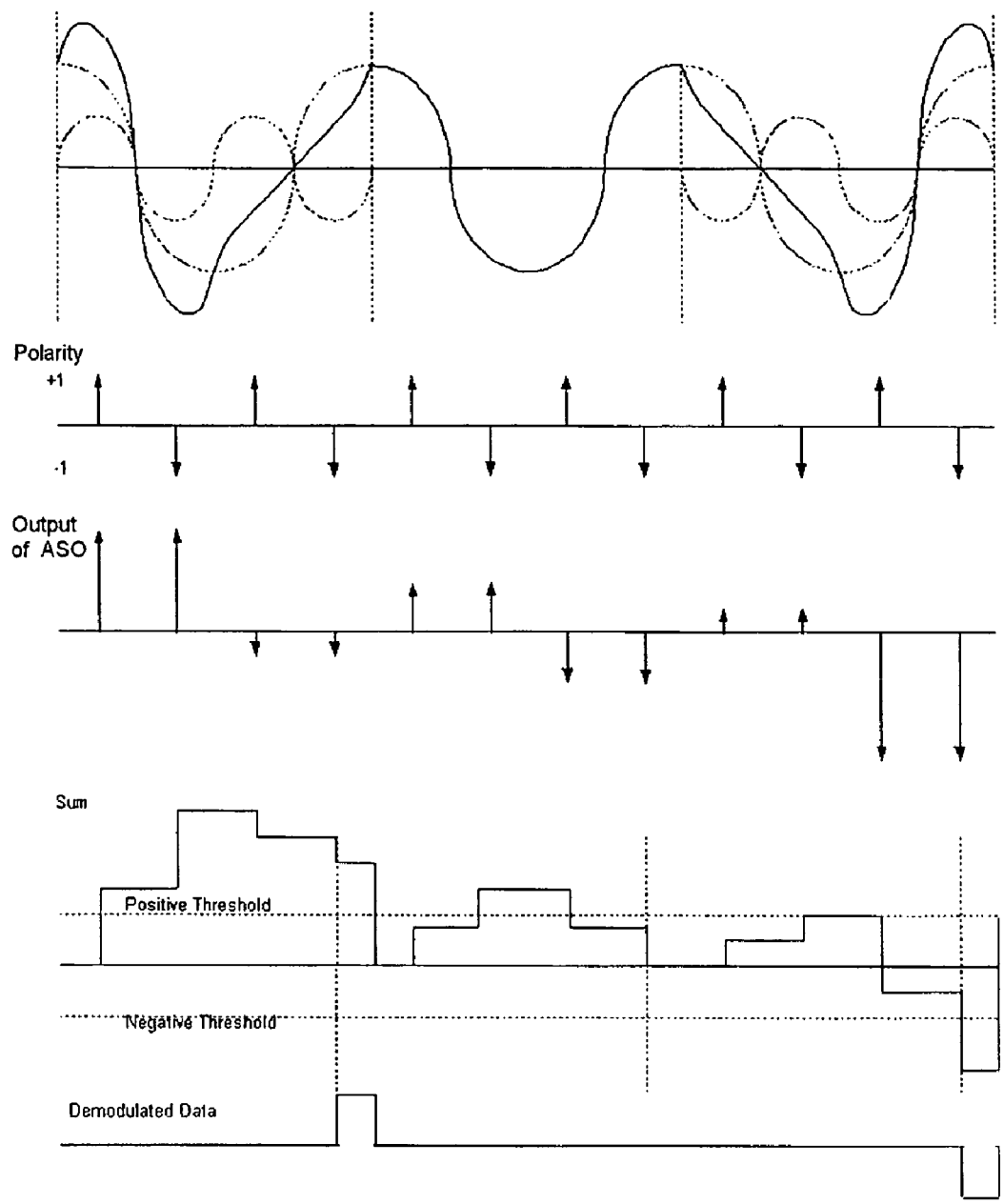
FIG. 4 illustrates a waveform of BD STW detection and the corresponding outputs of an alternate sign operator and accumulator according to an embodiment of the present invention.

For the STW modulation, the wobble is sampled four times, twice at the MAX and twice at the MIN of the second harmonic of the wobble frequency, as shown in FIG. 4, which illustrates a waveform of the BD STW detection, corresponding polarities for the maxima and minima, outputs of the ASO, the sum, and the demodulated data. The components of the STW, i.e., cos(ωt) and sin(2ωt), are also shown as dashed lines. As shown therein, the STW has two different modulations. The STW representing "0" has cos(ωt)−a*sin(2ωt), while the STW representing "1" has cos(ωt)+a*sin(2ωt). The sample is multiplied by the sign of the positive sine wave component. The STW with the positive second harmonic sine wave will have two large positive products followed by two small negative products, whereas the STW with the inverted second harmonic sine wave will have two small positive products followed by two large negative products. The monotone will have two medium positive products followed by two medium negative products. The sum is compared to a positive threshold and a negative threshold. If the sum is larger than the positive threshold, the STW is decoded as positive. If the sum is larger than the positive threshold, the STW is decoded as data "1". If the sum is smaller than the negative threshold, the STW is decoded as data "0". The monotone will give values which are somewhere in between, and the data is decoded as Monotone Wobble (MW).

Because the STW is repeated over 37 wobble cycles, i.e., from cycle 18 to cycle 54 of a wobble unit, the sum can be compared with the threshold values after summing over the 37 STW modulated cycles or with the threshold values for each cycle and determine the data "1" or data "0" from the resulting pattern. Thus, for STW, the method in FIG. 2 may optionally be implemented only every 37 cycles of the STW period. The data "1" and data "0" may also be detected by the BD-ADIP Address Decoder which can analyze the sequence of 37 demodulated STW data.

One aspect of the STW detection according to an embodiment of the present invention is the use of four digital samples within one wobble cycle. Because there are 69 channel clock cycles in one wobble cycle, evenly spaced samples are not available. Sampling at discrete points, e.g., 9/69, 26/69, 43/69 and 60/69, however, is sufficiently close to the maxima and minima of the base signal. Since samples are only taken at near the MIN or MAX of the second harmonic of the carrier signal, the signal-to-noise (S/N) is maximized, allowing detection without the use of an analog second harmonic oscillator.

The ASO which samples at MAX and MIN of the base signal can also be used to decode DVD formats, e.g., HD-DVD and DVD+R/RW. However, since the DVD formats only use bi-phase modulation, the detected outputs are only NPW and IPW, so the threshold logic is not needed unless a more robust detector is needed.

Figure 5:
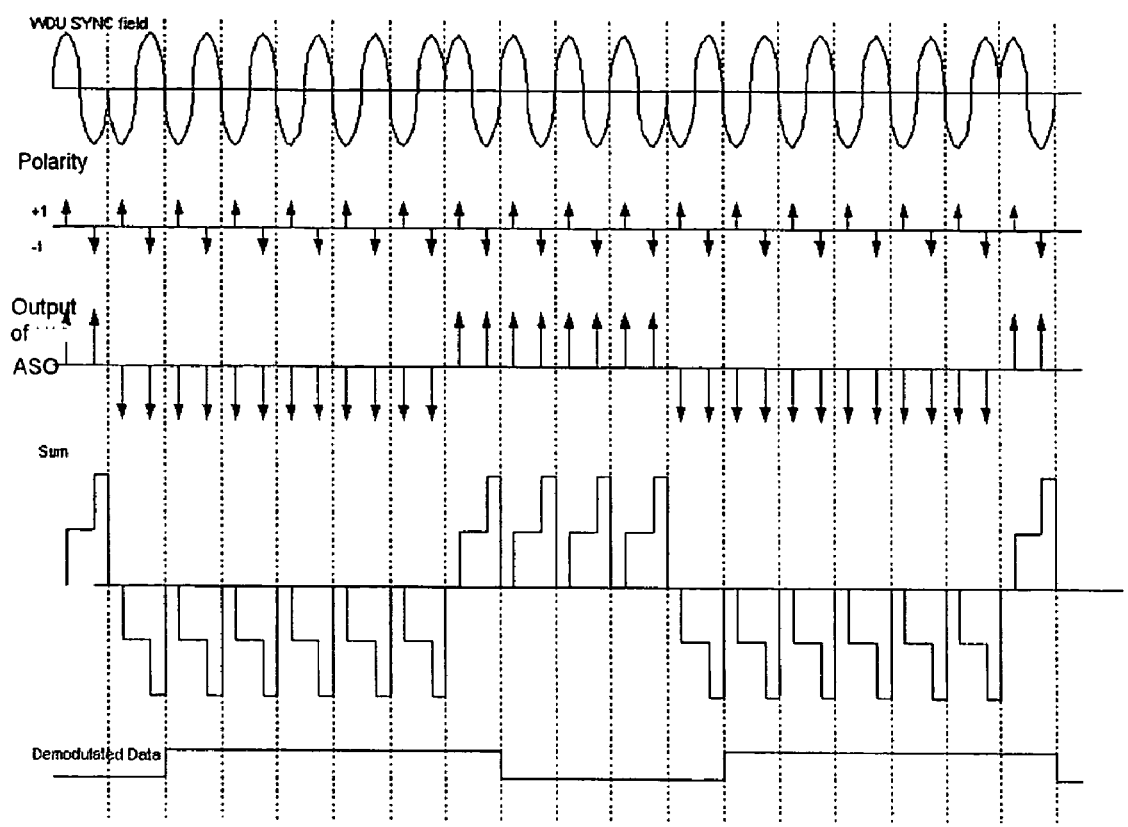
FIG. 5 illustrates a waveform of HD-DVD BP detection and the corresponding outputs of an alternate sign operator and accumulator according to an embodiment of the present invention.

FIG. 5 illustrates a waveform for HD-DVD detection, corresponding polarities for the maximum and minimum, outputs of the ASO, the sum, and the demodulated data. Here there is just phase inversion, so Normal Phase Wobble (NPW) and Invert Phase Wobble (IPW) are detected. The sequence is strictly NPW and IPW, so detection is simply detecting the proper pattern. Because noise may cause some bits to flip, a search protect state machine to guard against false detection and false unlock may be used.

Figure 6:
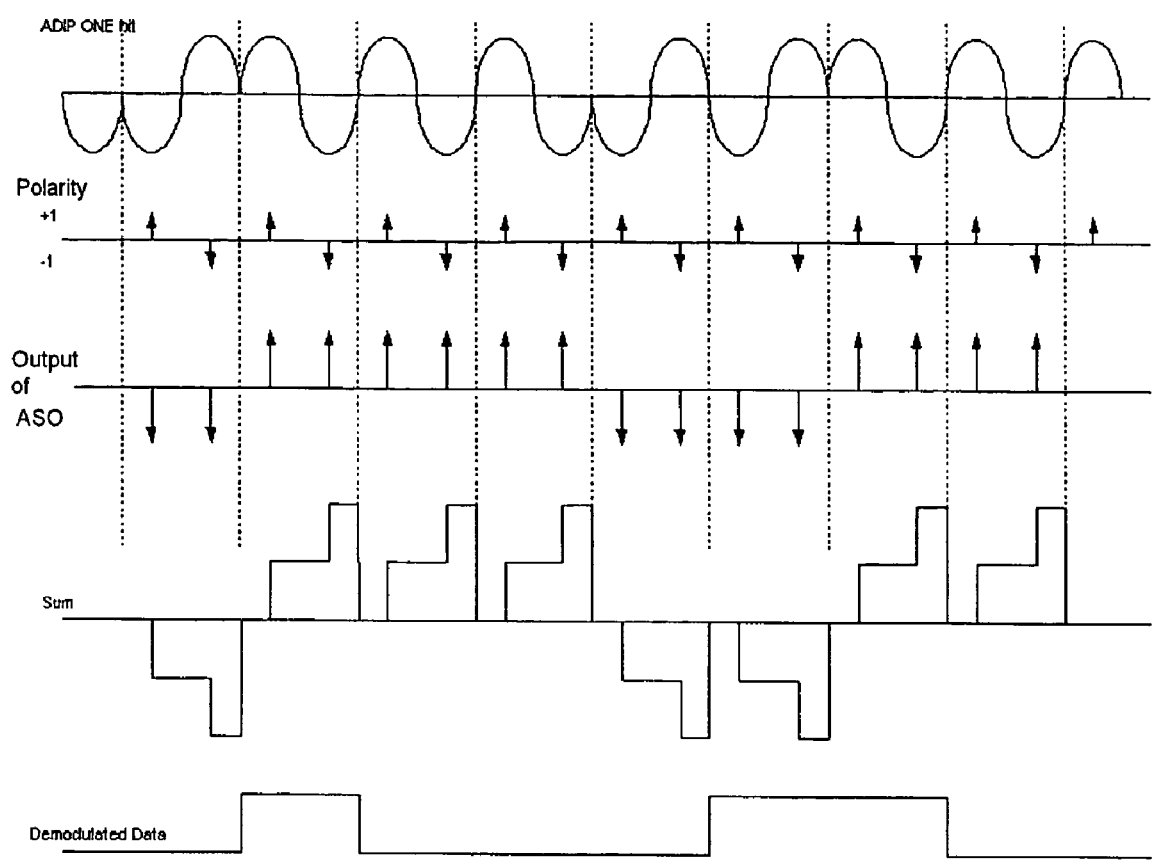
FIG. 6 illustrates a waveform of DVD+R/RW BP detection and the corresponding outputs of an alternate sign operator and accumulator according to an embodiment of the present invention.

FIG. 6 illustrates a waveform for DVD ADIP detection, corresponding polarities for the maximum and minimum, outputs of the ASO, the sum, and the demodulated data. The DVD ADIP format is very similar to the HD-DVD format in using only bi-phase modulation, but does not have as many cycles.

For HD-DVD and DVD+R/RW, which only rely on bi-phase modulation for address information, the same decoding logic used for BD detection can be used, e.g., by multiplying the sample data by positive one at the MAX of the base signal and by negative one at the MIN of the base signal.

Thus, in accordance with the present invention, decoding of Blu-ray disc and DVD formats may be realized using digital logic, thereby simplifying the system, reducing a number of components, reducing chip area required and reducing power consumption. While embodiments of the present invention have been described relative to a hardware implementation, the processing of present invention may be implemented in software, e.g., by an article of manufacture having a machine-accessible medium including data that, when accessed by a machine, cause the machine to detect data in the wobble signal.

Exemplary embodiments of the present invention have been disclosed herein, and although specific terms are employed, they are used and are to be interpreted in a generic and descriptive sense only and not for purpose of limitation. For example, while the decoders for the MSK and STW formats have been illustrated as being separate, they may be combined and controlled in accordance with their respective timing signals. Further, while MSK has been specifically discussed, other frequency shift keying (FSK) modulations may be similarly detected. Additionally, while STW has been specifically discussed, other harmonics of the carrier signal may be similarly detected. Accordingly, it will be understood by those of ordinary skill in the art that various changes in form and details may be made without departing from the spirit and scope of the present invention as set forth in the following claims.

What is claimed is:

1. A wobble detection method for detecting data in a wobble signal, comprising:
    sampling the wobble signal at a substantial maximum and a substantial minimum of a base signal within a wobble period;
    producing a value of the wobble signal at the substantial maximum of the base signal with an unchanged sign and producing a value of the wobble signal at the substantial minimum of the base signal with a reversed sign;
    generating a sum of the values within the wobble period; and
    decoding the sum to detect data.

2. The method as claimed in claim 1, further comprising comparing the sum to a threshold and determining a result to be used in decoding.

3. The method as claimed in claim 2, wherein comparing compares the sum to a positive threshold and a negative threshold.

4. The method as claimed in claim 3, wherein data are a first data type when the sum exceeds the positive threshold, data are a second data type when the sum exceeds a negative threshold and data are a third data type when the sum is between the positive and negative thresholds.

5. The method as claimed in claim 4, wherein the first data type is monotone wobble, the second data type is inverted wobble and the third data type is undefined.

6. The method as claimed in claim 4, wherein the first data type is one, the second data type is zero and the third data type is monotone wobble.

7. The method as claimed in claim 4, wherein the first data type is normal phase wobble, the second data type is inverted phase wobble and the third data type is undefined.

8. The method as claimed in claim 1, wherein the base signal is at a carrier frequency $\omega$ of the wobble signal.

9. The method as claimed in claim 8, wherein the base signal is $\cos(\omega t)$.

10. The method as claimed in claim 8, wherein the base signal is $\sin(\omega t)$.

11. The method as claimed in claim 1, wherein the base signal is at a harmonic of a carrier frequency $\omega$ of the wobble signal.

12. The method as claimed in claim 11, wherein the harmonic is the second harmonic.

13. The method as claimed in claim 12, wherein sampling includes sampling the wobble signal at substantially 0.125, 0.375, 0.625 and 0.875 of the cycle.

14. The method as claimed in claim 1, further comprising generating a sum for a plurality of wobble periods before decoding.

15. The method as claimed in claim 1, wherein sampling includes sampling at a plurality of maxima and a plurality of minima within the wobble period.

16. The method as claimed in claim 15, wherein the plurality equals two.

17. A detector for use with an optical pickup unit outputting a wobble signal, the detector comprising:
    a sampler to discretely sample the wobble signal at a substantial maximum and a substantial minimum of a base signal within a wobble period;
    an alternate sign operator to change a sign at alternate samples and to output resultant values;
    an accumulator to sum the values output by the alternate sign operator within the wobble period; and
    a decoder to decode a sum output by the accumulator.

18. The detector as claimed in claim 17, further comprising a comparator to compare the sum output by the accumulator with a threshold and to output a result to the decoder.

19. The detector as claimed in claim 18, wherein the comparator compares the sum to a positive threshold and a negative threshold.

20. The detector as claimed in claim 19, wherein data are a first data type when the sum exceeds the positive threshold, data are a second data type when the sum exceeds a negative threshold and data are a third data type when the sum is between the positive and negative thresholds.

21. The detector as claimed in claim 20, wherein the first data type is monotone wobble, the second data type is inverted wobble and the third data type is undefined.

22. The detector as claimed in claim 20, wherein the first data type is one, the second data type is zero and the third data type is monotone wobble.

23. The detector as claimed in claim 20, wherein the first data type is normal phase wobble, the second data type is inverted phase wobble and the third data type is undefined.

24. An article of manufacture having a machine-accessible medium including data that, when accessed by a machine, cause the machine to detect data in a wobble signal, detection comprising:
    sampling the wobble signal at a substantial maximum and a substantial minimum of a base signal within a wobble period;
    producing a value of the wobble signal at the substantial maximum of the base signal with an unchanged sign and producing a value of the wobble signal at the substantial minimum of the base signal with a reversed sign;
    generating a sum of the values within the wobble period; and
    decoding the sum to detect data.

* * * * *